United States Patent
Xavier et al.

(10) Patent No.: US 12,542,556 B2
(45) Date of Patent: Feb. 3, 2026

(54) RETIMER WITH SLICER LEVEL ADJUSTMENT

(71) Applicant: Texas Instruments Incorporated, Dallas, TX (US)

(72) Inventors: Ani Xavier, Bangalore (IN); Jagannathan Venkataraman, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 737 days.

(21) Appl. No.: 17/873,129

(22) Filed: Jul. 25, 2022

(65) Prior Publication Data

US 2024/0030926 A1    Jan. 25, 2024

(51) Int. Cl.
*H03L 7/085*    (2006.01)
*G06F 30/3312*    (2020.01)
(Continued)

(52) U.S. Cl.
CPC .......... *H03L 7/085* (2013.01); *G06F 30/3312* (2020.01); *H03L 7/0807* (2013.01);
(Continued)

(58) Field of Classification Search
CPC ....... H03L 7/085; H03L 7/0807; H03L 7/083; H03L 7/1072; H04L 25/242; H03K 3/023;
(Continued)

(56) References Cited

U.S. PATENT DOCUMENTS 4,398,154 A * 8/1983 Lee .......................... H03K 5/06
327/172
5,680,302 A * 10/1997 Iwata ................. H02M 7/53873
363/41
(Continued)

FOREIGN PATENT DOCUMENTS

EP    3996095 A1 *  5/2022  ............... G11C 8/10
GB    2285316 A  *  7/1995  ............. H03K 5/086
(Continued)

OTHER PUBLICATIONS

Buckwalter et al., "Analysis and Equalization of Data-Dependent Jitter", IEEE Journal of Solid-State Circuits, vol. 41, No. 3, Mar. 2006, pp. 607-620. (Year: 2006).*
(Continued)

*Primary Examiner* — Phallaka Kik
(74) *Attorney, Agent, or Firm* — Xianghui Huang; Frank D. Cimino

(57) ABSTRACT

In described examples, a retimer includes a reference voltage generator, first, second, third, and fourth comparators, a hit sensor, a window results comparison circuit, and a window control circuit. First inputs of the first, second, third, and fourth comparators receive samples of a data stream. First, second, third, and fourth outputs of the reference voltage generator are coupled to respective second inputs of the first, second, third, and fourth comparators. The third and fourth comparators output to, respectively, first and second inputs of the hit sensor. The hit sensor outputs to an input of the window results comparison circuit. The window results comparison circuit outputs to an input of the window control circuit. The window control circuit outputs to an input of the reference voltage generator.

18 Claims, 7 Drawing Sheets

(51) Int. Cl.
*H01L 23/00* (2006.01)
*H01L 25/00* (2006.01)
*H03K 3/023* (2006.01)
*H03K 5/00* (2006.01)
*H03L 7/08* (2006.01)
*H03L 7/083* (2006.01)
*H03L 7/107* (2006.01)
*H04L 25/24* (2006.01)

(52) U.S. Cl.
CPC ............ *H03L 7/083* (2013.01); *H03L 7/1072* (2013.01); *H04L 25/242* (2013.01)

(58) Field of Classification Search
CPC ........... H03K 5/00; H01L 23/00; H01L 25/00; G06F 30/3312
USPC ........ 326/93, 62, 41, 47, 101; 716/108, 113; 703/16
See application file for complete search history.

(56) References Cited

U.S. PATENT DOCUMENTS

| | | | | |
|---|---|---|---|---|
| 6,014,768 | A * | 1/2000 | Lee | H04L 1/0054 |
| | | | | 714/795 |
| 6,937,085 | B1 * | 8/2005 | Samaddar | G11C 7/062 |
| | | | | 327/393 |
| 9,715,913 | B1 * | 7/2017 | Yin | G01K 7/01 |
| 10,091,036 | B1 * | 10/2018 | Hossain | H04L 25/4917 |
| 2006/0083324 | A1 * | 4/2006 | DesJardins | H04L 1/0057 |
| | | | | 375/260 |
| 2011/0122660 | A1 * | 5/2011 | Cacciotto | H02M 3/33515 |
| | | | | 363/21.18 |
| 2011/0157374 | A1 * | 6/2011 | Chang | H04N 5/08 |
| | | | | 348/194 |
| 2017/0169788 | A1 * | 6/2017 | Kim | G09G 3/3677 |
| 2019/0155431 | A1 * | 5/2019 | Lee | H03M 1/12 |
| 2021/0075650 | A1 * | 3/2021 | Rane | H04L 25/03057 |
| 2021/0328592 | A1 * | 10/2021 | Chen | H03L 7/146 |
| 2022/0093140 | A1 * | 3/2022 | Zhang | G11C 7/1093 |
| 2022/0229750 | A1 * | 7/2022 | Lu | G06F 12/0246 |
| 2023/0050659 | A1 * | 2/2023 | Zhang | H04L 27/32 |
| 2023/0275593 | A1 * | 8/2023 | Bunsen | H03M 1/1061 |
| | | | | 341/118 |

FOREIGN PATENT DOCUMENTS

| | | | | |
|---|---|---|---|---|
| KR | 101794712 B1 * | 11/2017 | | H04L 5/14 |
| WO | WO-9612349 A1 * | 4/1996 | | H03M 1/0682 |
| WO | WO-2022062467 A1 * | 3/2022 | | G11C 11/4074 |

OTHER PUBLICATIONS

Jaussi et al., "8-GB/s Source-Synchronous I/O Link With Adaptive Receiver Equalization, Offset Cancellation, and Clock De-Skew", IEEE Journal of Solid-State Circuits, vol. 40, No. 1, Jan. 2005, pp. 80-88. (Year: 2005).*

Yoichiro, Canadian Patent Document No. CA-2139050-C, published Feb. 23, 1999, 1 page including abstract. (Year: 1999).*

Cui et al., Chinese Patent Document No. CN-110995265-A, published Apr. 10, 2020, 4 pages including abstract, claim and 1 drawing. ( Year: 2020).*

* cited by examiner

502 — IN RESPONSE TO THE SYSTEM CLOCK 312, THE WINDOW CONTROL CIRCUIT 344 ASSERTS THE ENABLE SIGNAL TO ACTIVATE THE FOURTH AND FIFTH ERROR COMPARATORS 332 AND 334

504 — THE WINDOW CONTROL CIRCUIT CAUSES THE $V_{REF}$ GENERATOR 348 TO PROVIDE A TEST PAIR OF $V_{REF\_LO}$ AND $V_{REF\_HI}$ THAT ARE A FIXED NUMBER W VOLTS APART TO THE RESPECTIVE SECOND INPUTS OF THE FOURTH AND FIFTH ERROR COMPARATORS 332 AND 334

506 — A FRACTION S/N OF THE SAMPLES BEING USED TO TEST THE REFERENCE VOLTAGE ARE PROVIDED TO THE RESPECTIVE FIRST INPUTS OF THE FOURTH AND FIFTH ERROR COMPARATORS 322 AND 324

508 — THE HIT COUNTER 342 COUNTS THE NUMBER OF SAMPLES WITH VOLTAGES BETWEEN $V_{REF\_LO}$ AND $V_{REF\_HI}$

510 — AFTER S/N SAMPLES ARE TESTED USING THE $V_{REF\_LO}$ AND $V_{REF\_HI}$ PAIR, THE WINDOW CONTROL CIRCUIT 344 SENDS A STORE SIGNAL TO CAUSE THE HIT COUNTER 340 TO STORE THE CURRENT COUNT IN THE MEMORY 342

512 — THE PROCESS 500 IS REPEATED FROM STEP 504 FOR A NUMBER N TEST PAIRS OF $V_{REF\_LO}$ AND $V_{REF\_HI}$, WITH CENTER VOLTAGES OF SOME TEST PAIRS DISPLACED ABOVE AND CENTER VOLTAGES OF SOME TEST PAIRS DISPLACED BELOW THE DEFAULT REFERENCE VOLTAGE, CENTER VOLTAGES OF DIFFERENT TEST PAIRS DISPLACED FROM EACH OTHER BY A MINIMUM VOLTAGE INCREMENT OF THE $V_{REF}$ GENERATOR 348

514 — AFTER S SAMPLES HAVE BEEN TESTED, THE WINDOW CONTROL CIRCUIT 344 CAUSES THE MEMORY 342 TO OUTPUT THE HIT COUNTS FOR EACH TEST PAIR TO THE WINDOW RESULTS COMPARISON CIRCUIT 346

516 — THE WINDOW RESULTS COMPARISON CIRCUIT 346 DETERMINES WHICH TEST PAIR PRODUCED THE LOWEST HIT COUNT FOR THE VOLTAGE SLICER REFERENCE VOLTAGE BEING TESTED IN THE CURRENT ITERATION, AND STORES A CENTER VOLTAGE OF THE TEST PAIR IN THE MEMORY 342

518 — THE PROCESS 500 IS REPEATED FROM STEP 504 FOR A SYMMETRIC VOLTAGE SLICER REFERENCE VOLTAGE

520 — THE CENTER VOLTAGES OF THE TEST PAIRS THAT PRODUCED THE LOWEST HIT COUNTS ARE ADJUSTED TO REMOVE AN OFFSET CONTRIBUTION, AND THE ADJUSTED CENTER VOLTAGES ARE USED AS CORRESPONDING VOLTAGE SLICER REFERENCE VOLTAGES

RETIMER WITH SLICER LEVEL ADJUSTMENT

TECHNICAL FIELD

This application relates generally to retimers, and more particularly to detecting a level of a signal received by a retimer.

BACKGROUND

A retimer is used to detect a data stream, and to generate and transmit a fresh copy of the data stream. This is used, for example, to extend a useful transmission range of the data stream. The data stream is generated using a clock signal. However, the retimer may not receive the generating clock signal. In some designs, these retimers use a clock data recovery (CDR) loop to generate a new clock signal (with a frequency and a phase matching the generating clock signal) so as to recover the received data stream. A CDR includes a phase locked loop (PLL) or a delay locked loop (DLL), with a charge pump, a loop filter, and a feedback loop.

The recovered clock signal is used to sample the data stream. Individual symbols in the data stream have one of two or more different possible logical values, corresponding to two or more different ideal voltage levels. Different ideal voltage levels of the samples correspond to different ones of the possible logical values. To recover the symbol content of the data stream for retransmission, one or more voltage slicers is used to determine which of the possible logical values actual sample voltages correspond to. The voltage slicers use the generated clock signal to recover symbol content of the data stream. The retimer then uses the generated clock signal and recovered symbol content to generate the fresh copy of the data stream.

In some examples, a retimer is used to implement serializer/deserializer ("SerDes") functionality. A SerDes can be used in high speed communications to enable devices to reduce a required number of input/output channels, such as interconnects between integrated circuits on a printed circuit board (PCB). The SerDes translates a data stream between parallel and serial communication interfaces, using CDR to generate a clock signal corresponding to the clock signal used to generate the data stream. The SerDes multiplies (or divides) this generated clock signal by a selected factor so that the SerDes can translate the data stream between clock domains applicable to the parallel and serial communication regimes.

SUMMARY

In described examples, a retimer includes a reference voltage generator, first, second, third, and fourth comparators, a hit sensor, a window results comparison circuit, and a window control circuit. First inputs of the first, second, third, and fourth comparators receive samples of a data stream. First, second, third, and fourth outputs of the reference voltage generator are coupled to respective second inputs of the first, second, third, and fourth comparators. The third and fourth comparators output to, respectively, first and second inputs of the hit sensor. The hit sensor outputs to an input of the window results comparison circuit. The window results comparison circuit outputs to an input of the window control circuit. The window control circuit outputs to an input of the reference voltage generator.

BRIEF DESCRIPTION OF THE DRAWINGS

FIG. 5 shows an example process for adjusting reference voltages of voltage slicers in the retimer of FIG. 3.

The same reference numbers or other reference designators are used in the drawings to designate the same or similar (functionally and/or structurally) features.

DETAILED DESCRIPTION

Figure 1:
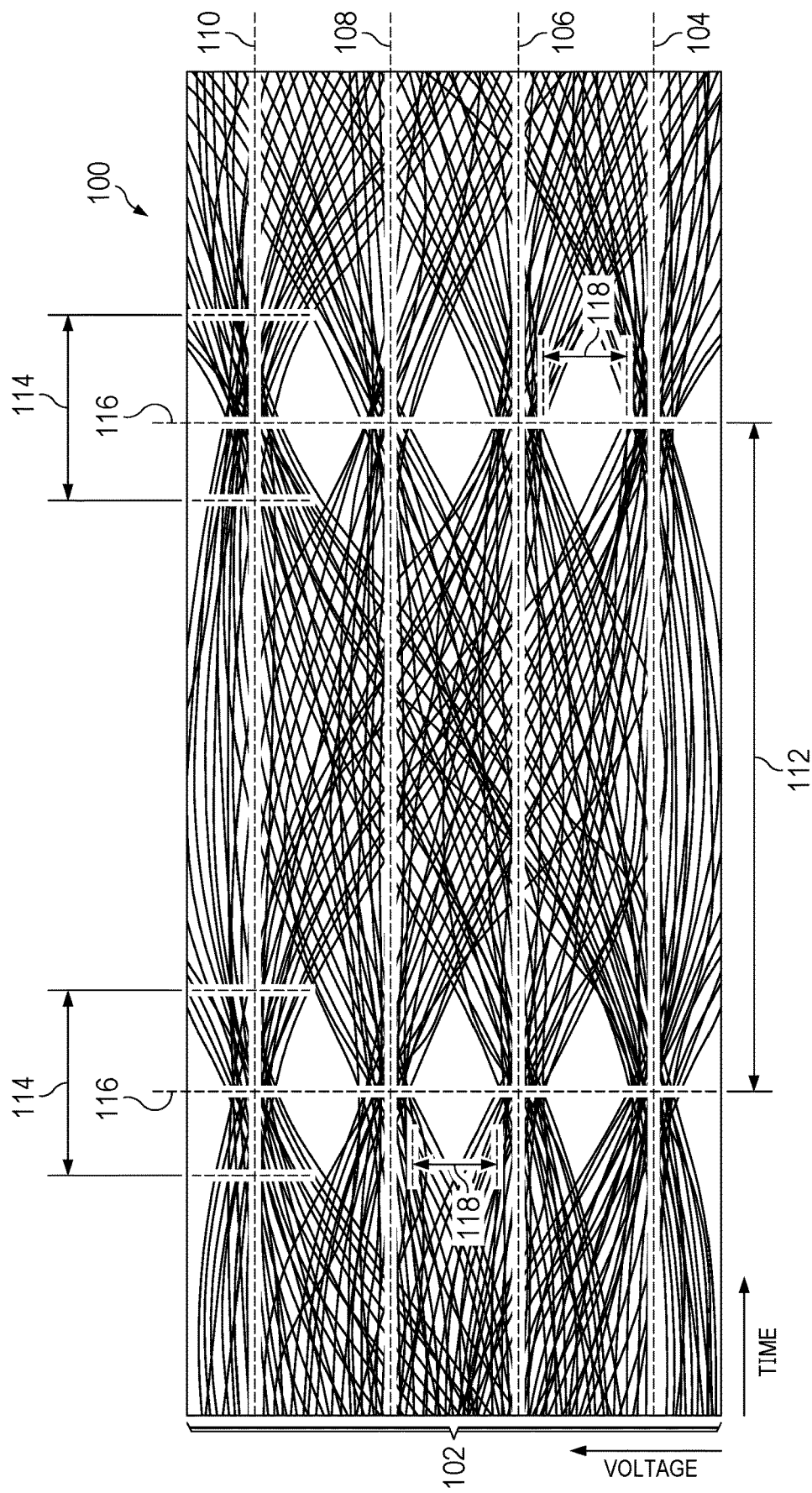
FIG. 1 illustrates an eye pattern for an example pulse amplitude modulation four level (PAM4) signal.
Figure 2A:
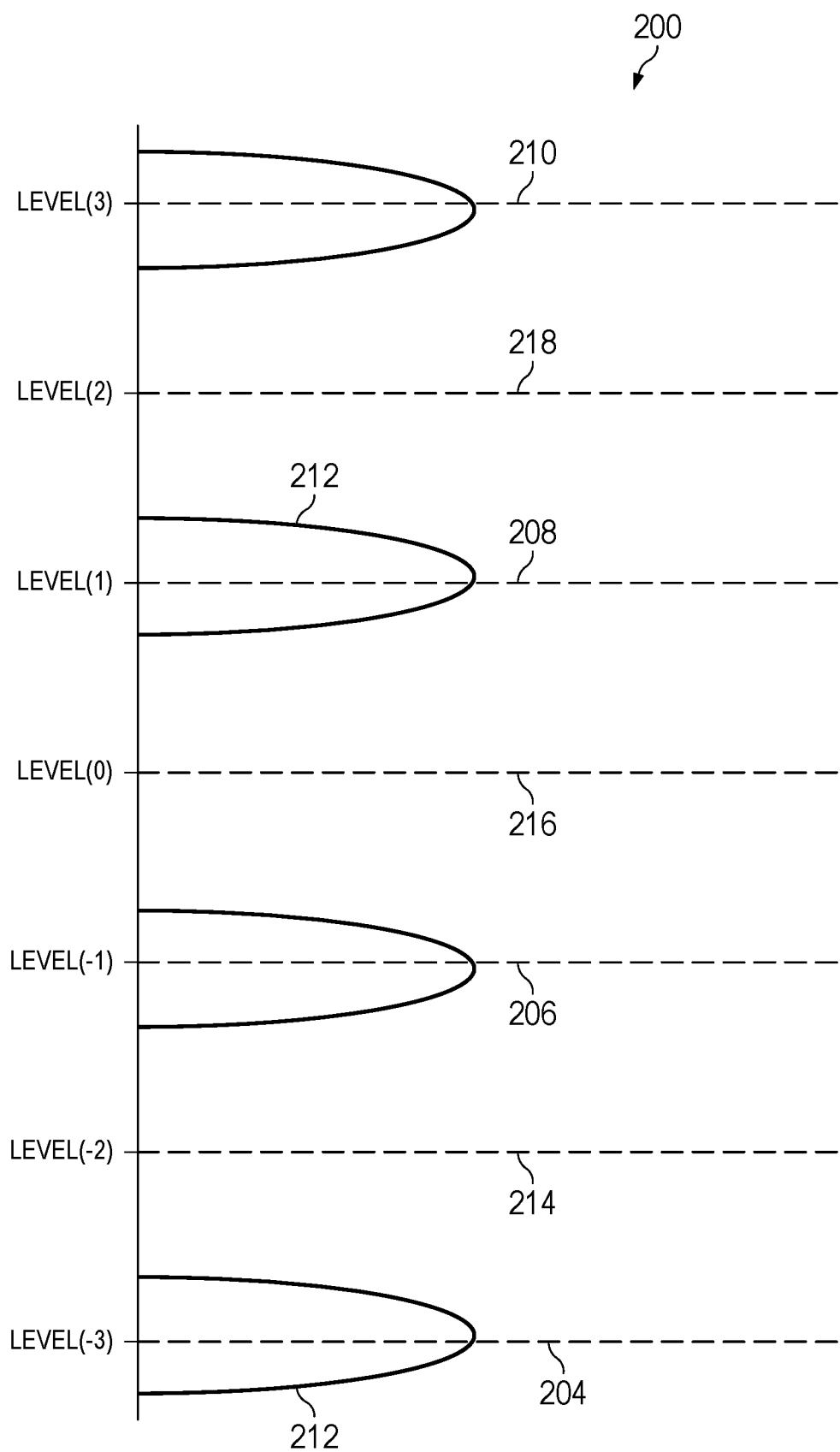
FIG. 2A shows a probability distribution for an example sample taken at the eye center of a PAM4 signal, in which the PAM4 signal does not exhibit gain compression due to nonlinearity.
Figure 2B:
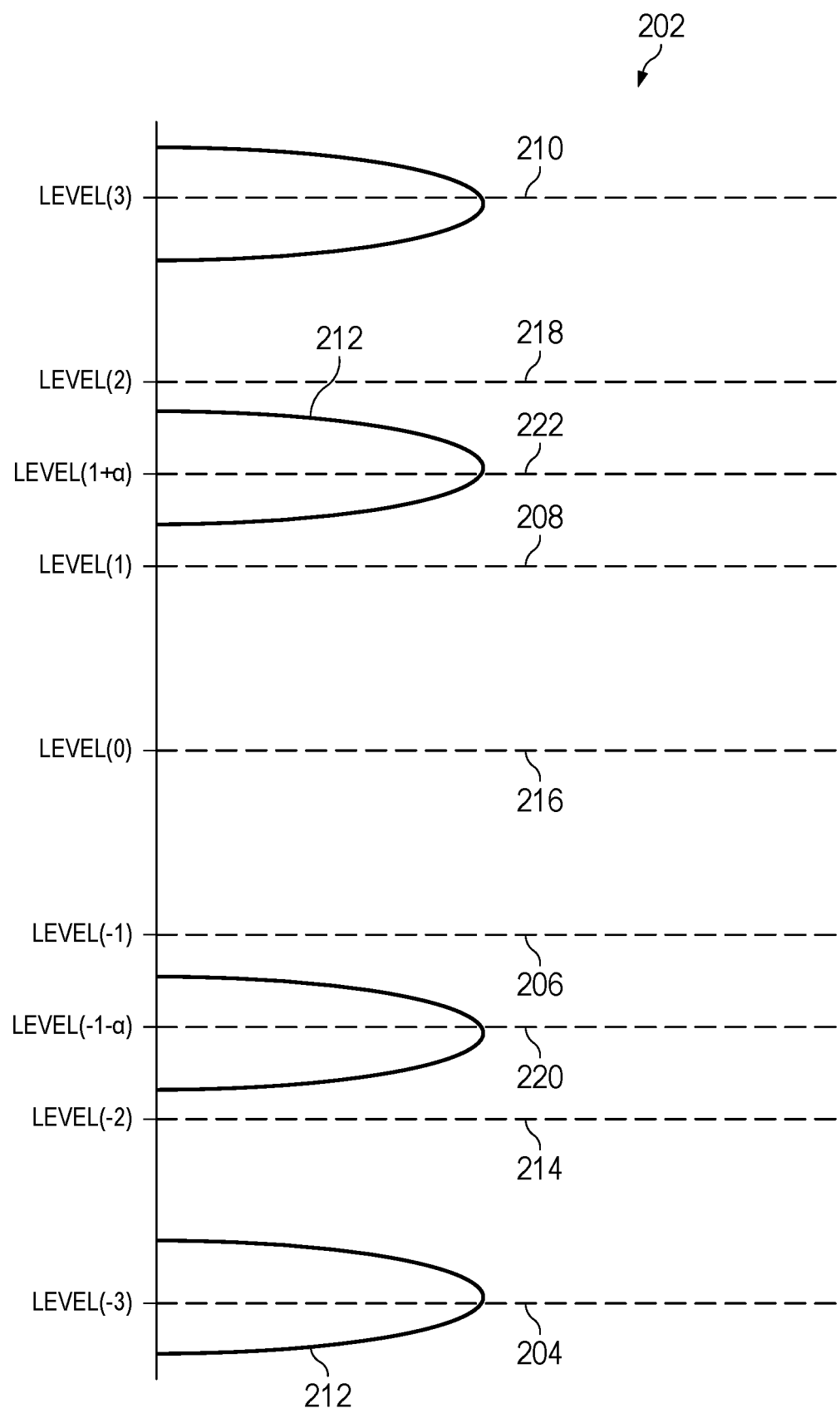
FIG. 2B shows a probability distribution for an example sample taken at the eye center of the PAM4 signal, in which the PAM4 signal exhibits gain compression due to nonlinearity.

In some examples, a data stream is communicated with varying voltage levels representing symbols, each symbol including plural simultaneous data values (FIG. 1). The voltage levels may be characterized by a probability distribution (FIGS. 2A and 2B). The data stream is received and processed by various functional blocks of a retimer (FIG. 3), in an effort to identify the symbol data, to approximate a corresponding data clock signal, and to retransmit the data per the approximated data clock signal. The retimer includes equalizer stages, in part to reduce the negative signal-to-noise ratio (SNR) effects of inter-symbol interference (ISI), which in part increase with data rate. However, increased equalization can, as a tradeoff, increase nonlinear gain, as may amplification of the received signal. Voltage slicers in the retimer determine data values by testing samples in comparison to expected midpoint voltage values. The non-linearity can reduce performance of the voltage slicers by rendering the midpoint values incorrect, thereby adversely affecting bit error rate (BER). In an example, the retimer further includes a windowing function (FIGS. 4 and 5) to iteratively determine corrected midpoint values and thereby reduce the effects of such nonlinear signal amplification gain.

FIG. 1 illustrates an eye pattern 100 for an example pulse amplitude modulation four level (PAM4) signal 102. A horizontal axis represents time, and a vertical axis represents voltage. The PAM4 signal 102 has four voltage levels corresponding to four different possible data values for a symbol in the signal 102. Four possible signal levels permit encoding of two data bits sent per unit interval (UI) 112. The voltage levels are approximated as a first level 104, a second level 106, a third level 108, and a fourth level 110. (Herein, approximately means within design parameters and manufacturing tolerances.) A signal's UI 112 is the minimum time interval between symbols in the signal 102. In some examples, the UI 112 equals a period of a clock used to generate the signal 102. The eye pattern 100 is a visualization of the probability density function of the signal 102, modulo the UI 112; the cross-hatched region of the signal 102 corresponds to different possible voltage levels of the signal 102 at different times. Accordingly, the eye pattern 100 indicates the voltage spread of the signal 102 across the duration of the UI 112.

The different voltage levels 104, 106, 108, and 110 surround one or more eyes 114, where the noise of variable signal 102, including variable timing of transitions between voltage levels 104, 106, 108, and 110, is minimized. At the beginning and end of each UI 112, the cross-hatched possibilities converge toward the various different voltage levels, leaving a gap shaped in a manner so as to be referred to as an eye 114. Accordingly, a center 116 of the eye 114 corresponds to the largest voltage gap 118 between probability bundles of relatively lower voltage levels (such as voltage level 104, 106, or 108) and relatively next-higher voltage levels (such as voltage level 106, 108, or 110, respectively). The signal 102 is intended to be sampled at the eye center 116, which is the sampling timing that produces the highest SNR and achieves the lowest BER. Within a well-bounded eye 114, statistical tails of probability bundles corresponding to signal voltage levels representing symbol data values are reduced or avoided. The tradeoff between data rate and SNR, the use of equalizer stages to reduce SNR, and the correlation between an increased number of equalizer stages and increased gain compression, means that there is also a tradeoff between well-bounded eyes 114 and gain compression.

FIG. 2A shows a probability distribution 200 for an example sample taken at the eye center of a PAM4 signal, in which the PAM4 signal does not exhibit gain compression due to nonlinearity. The PAM4 signal has four ideal voltage levels corresponding to four symbol data values. These ideal voltage levels are referred to herein as level(-3) 204, level(-1) 206, level(1) 208, and level(3) 210, and respectively correspond to the first, second, third, and fourth levels 104, 106, 108, and 110 of FIG. 1. In an example, a level(-3) 204 ideal voltage is -200 mV, a level(-1) 206 ideal voltage is -66.66 mV, a level(1) 208 ideal voltage is 66.66 mV, and a level(3) 210 ideal voltage is 200 mV. The level numbers (-3, -1, 1, and 3) equal the ideal voltage levels 204, 206, 208, and 210 multiplied by a constant k, and correspond to a level(-3) data value, a level(-1) data value, a level(1) data value, and a level(3) data value. An elevated probability region 212 is located at each of the ideal voltage levels 204, 206, 208, and 210. Elevated probability regions 212 represent the probability distribution of sample voltages, and can be viewed as the portions of an eye pattern 100 between vertically adjacent pairs of eyes 114. The SNR of a sample measurement system equals, for example, the voltage distance between two vertically adjacent eyes, divided by the standard deviation of the noise.

The elevated probability regions 212 show the most likely voltages that the sampled PAM4 signal has at the time of sampling, and the probability that the sampled PAM4 signal has each respective voltage. Other voltages are possible, but relatively unlikely, due to the equalizer stages attenuating statistical tails. In some examples, portions of the probability distribution 200 outside elevated probability regions 212 have probabilities low enough not to visibly appear; these low-probability portions are not shown in FIG. 2A (or FIG. 2B).

For an integer N possible symbol data values for a data stream (corresponding to N ideal voltage levels), N-1 data slicers are used to determine which possible symbol data value the voltage of a sample corresponds to. For example, three voltage slicers are used to discriminate among the four levels 204, 206, 208, and 210 of the PAM4 signal. Example voltage slicers 322, 324, and 326 for determining symbol data values corresponding to PAM4 signal samples are shown in and described below with respect to FIG. 3.

The probability of a sample having a voltage outside a corresponding elevated probability region 212 is distributed so that the likelihood of a voltage slicer returning an incorrect result is minimized if the voltage slicer compares the sample voltage to a reference voltage midway between adjacent elevated probability regions 212. Accordingly, voltage slicers use reference voltages midway between adjacent ideal voltage levels to perform their data value determination function. These reference voltages are referred to herein as level(-2) 214, level(0) 216, and level(2) 218. In an example corresponding to the example ideal symbol voltage levels described above, a level(-2) 214 voltage is -133.33 mV, a level(0) 216 voltage is 0 mV, and a level(2) 218 voltage is 133.33 mV. A voltage slicer receiving the level(-2) 214 reference voltage discriminates between the elevated probability regions 212 at level(-3) 204 and level(-1) 206. A voltage slicer receiving the level(0) 216 reference voltage discriminates between the elevated probability regions 212 at level(-1) 206 and level(1) 208. And a voltage slicer receiving the level(2) 218 reference voltage discriminates between the elevated probability regions 212 at level(1) 208 and level(3) 210.

FIG. 2B shows a probability distribution 202 for an example sample taken at the eye center of the PAM4 signal, in which the PAM4 signal exhibits gain compression due to nonlinearity. As detailed below, an example retimer processes a data stream with variable gain amplification, which compensates for signal amplitude loss caused by the channel but may introduce a nonlinear gain. Nonlinear gain means that lower amplitude portions of the signal receive higher gain than higher amplitude portions of the signal, referred to as gain compression, as further discussed with reference to FIG. 2B. In FIG. 2B, the horizontal axis represents probability, and the vertical axis represents voltage. The FIG. 2A level(-1) 206 is shown again, but the elevated probability region 212 that is nominally aligned to that level in FIG. 2A is, in FIG. 2B, shifted downward by gain compression by a voltage a, so that it is centered around a different voltage, referred to herein as level(-1-a) 220. Also, the FIG. 2A level(1) 208 is shown again, but the elevated probability region 212 that is nominally aligned to level(1) 208 in FIG. 2A is shifted upward by gain compression by the voltage a, so that it is centered around a different voltage, referred to herein as level(1+a) 222. The distance between the level(-1-a) 220 elevated probability region 212 and the level(-2) 214 reference voltage is narrower than the distance between the level(-3) 204 elevated probability region 212 and the level(-2) 214 reference voltage. Accordingly, SNR for a corresponding measurement by a voltage slicer is reduced, because the level(-2) 214 reference voltage is no longer at the midpoint between corresponding adjacent elevated probability regions 212. There is a similar adverse effect on SNR of voltage slicer measurements using the level(2) 218 reference voltage, which is now closer to the level(1+a) 222 elevated probability region 212 than to the level(3) 210 elevated probability region 212.

Figure 3:
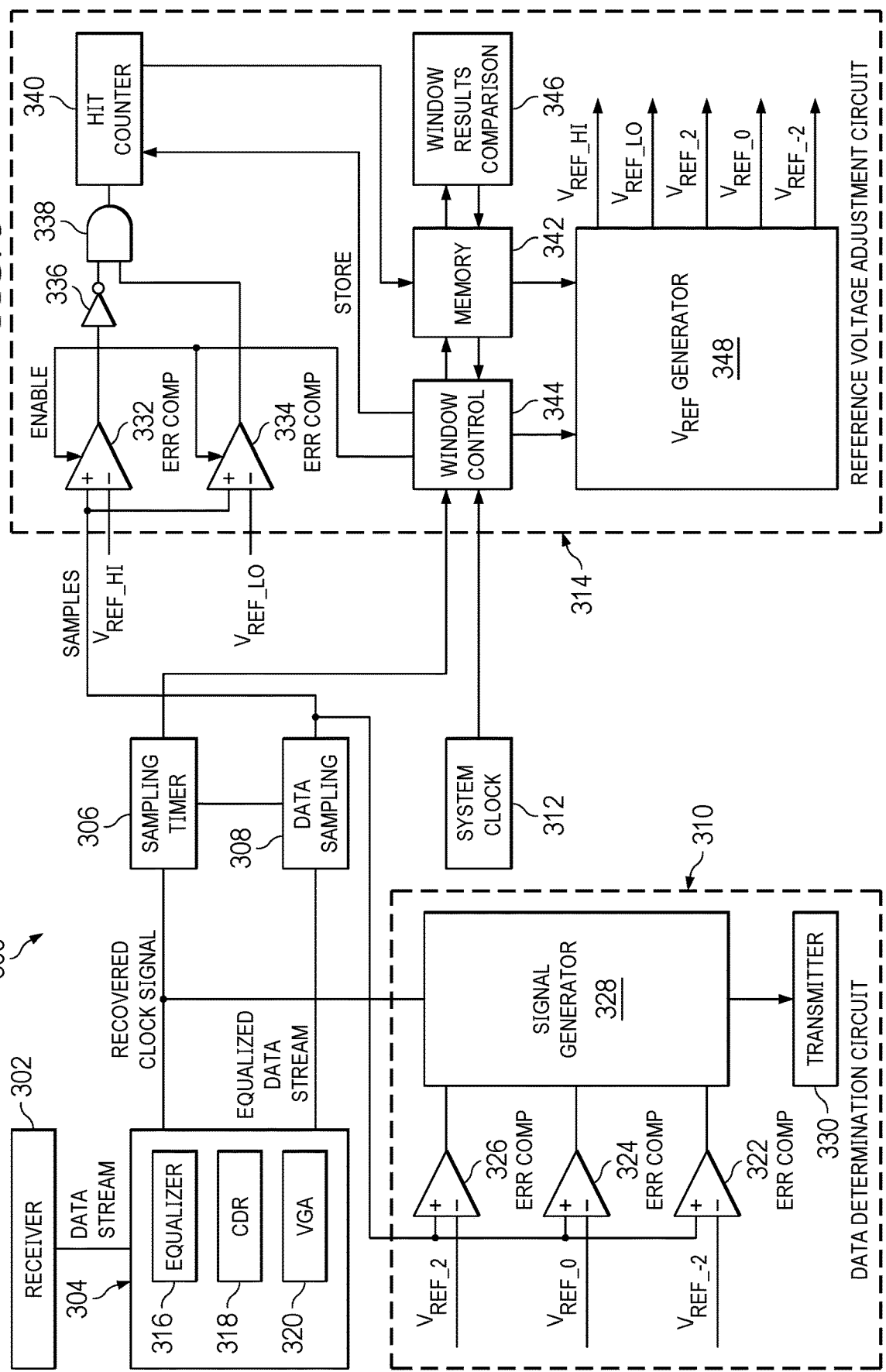
FIG. 3 shows a functional block diagram of an example retimer.

FIG. 3 shows a functional block diagram of an example retimer 300. The retimer 300 includes a receiver 302, a clock and signal recovery circuit 304, a sampling timer 306, a data sampling circuit 308, a data determination circuit 310, a system clock 312, and a reference voltage adjustment circuit 314. The clock and signal recovery circuit 304 includes an equalizer circuit 316 including one or more equalizer stages, a clock data recovery circuit 318, and a VGA 320. The data determination circuit 310 includes a first voltage slicer 322, a second voltage slicer 324, and a third voltage slicer 326, respectively corresponding to a third error comparator (ERR COMP) 322, a fourth error comparator 324, and a fifth error comparator 326. The data determination circuit 310 also includes a signal generator 328 and a transmitter 330. The reference voltage adjustment circuit 314 includes a first error comparator 332, a second error comparator 334, a logical inverter 336, an AND gate 338, a hit counter 340, a memory 342, a window control circuit 344, a window results comparison circuit 346, and a reference voltage ($V_{REF}$) generator 348.

In some examples, the receiver 302 receives (via, for example, a connection to external circuitry and/or a bus) a PAM4 data stream, which it outputs to blocks in the clock and signal recovery circuit 304, each performing a respective function on the data stream. The equalizer circuit 316 uses one or more equalizer stages to reduce the ISI of the data stream. For example, the stages of the equalizer circuit 316 stages include one or more of a continuous time linear equalizer (CTLE), a feedforward equalizer (FFE), or a decision feedback equalizer (DFE). The equalizer circuit 316 compensates for ISI introduced by the channel (e.g., a bus and/or data lines connected to receiver 302, whereby the data is received by the receiver 302 via the bus/data lines). ISI refers to corruption in symbols of the received signal caused by voltage pulses spreading beyond their respective allotted time intervals so that they interfere with neighboring pulses. ISI is caused by, for example, multipath propagation, or by the frequency response of a communication channel causing symbols to blur together with subsequent symbols. ISI is increased at higher data rates, which correspond to higher clock frequencies used to generate the data stream. The CDR 318 recovers a clock signal from the data stream with a frequency attempting to equal that of a clock signal used to generate the data stream, and with a phase attempting to match a phase of eye centers of the data stream. The VGA 320 amplifies the data stream, compensating for channel amplitude loss, so that a voltage range between a local maximum of an elevated probability region 212 of the data stream corresponding to the level(−3) data value and a local maximum of an elevated probability region 212 of the data stream corresponding to the level(3) data value equals the range between the level(−3) 204 voltage and the level(3) 210 voltage. In some examples, the equalizer circuit 316 and the VGA 320 processing may introduce signal nonlinearity, including nonlinear gain. The clock and signal recovery circuit 304 outputs a recovered clock signal to the sampling timer 306 and to a first input of the signal generator 328. The clock and signal recovery circuit 304 also outputs an equalized data stream to the data sampling circuit 308.

The sampling timer 306 uses the recovered clock signal to generate a sampling timing signal, which the sampling timer 306 outputs to the data sampling circuit 308 and to the window control circuit 344. The data sampling circuit 308 uses the sampling timing signal to sample the equalized data stream, producing samples. The data sampling circuit 308 outputs the samples to respective first inputs of the first, second, and third data slicers 322, 324, and 326, and to the first inputs of the first and second error comparators 332 and 334. The $V_{REF}$ generator 348 outputs: a level(−2) reference voltage $V_{REF\_-2}$ to a second input of the first data slicer 322; a level(0) reference voltage $V_{REF\_0}$ to a second input of the second data slicer 324; and a level(2) reference voltage $V_{REF\_2}$ to a second input of the third data slicer 326.

The first, second, and third data slicers 322, 324, and 326 compare the samples received from the data sampling circuit 308 to the respective reference voltages $V_{REF\_-2}$, $V_{REF\_0}$, and $V_{REF\_2}$, and output to respective second, third, and fourth inputs of the signal generator 328. The reference voltages $V_{REF\_-2}$, $V_{REF\_0}$, and $V_{REF\_2}$ are adjusted by the reference voltage adjustment circuit 314 in response to gain compression caused by the equalizer circuit 316 and the VGA 320, as further described below. The signal generator 328 uses the recovered clock signal and the outputs of the first, second, and third data slicers 322, 324, and 326 to generate a recovered PAM4 signal that ideally equals the PAM4 signal received by the receiver 302, without channel noise. For example, a symbol of the recovered PAM4 signal has a level(−3) 204 voltage if the first data slicer 322 determines that a sample has a voltage less than $V_{REF\_-2}$; a level(−1) 206 voltage if the first and second data slicers 322 and 324 determine that the sample has a voltage between $V_{REF\_-2}$ and $V_{REF\_0}$; a level(1) 208 voltage if the second and third data slicers 324 and 326 determine that the sample has a voltage between $V_{REF\_0}$ and $V_{REF\_-2}$; and a level(3) 210 voltage if the third data slicer 326 determines that the sample has a voltage greater than $V_{REF\_2}$. The signal generator 328 outputs the recovered PAM4 signal to the transmitter 330, which transmits the recovered PAM4 signal out of the retimer 300.

As described above, respective first inputs of the first and second error comparators 332 and 334 receive the samples from the data sampling circuit 308. The $V_{REF}$ generator 348 outputs a relatively high reference voltage $V_{REF\_HI}$ to a second input of the first error comparator 332, and the $V_{REF}$ generator 348 outputs a relatively low reference voltage $V_{REF\_LO}$ to a second input of the second error comparator 334. The first error comparator 332 outputs to a logical inverter 336. The logical inverter 336 outputs to a first input of the AND gate 338. The second error comparator 334 outputs to a second input of the AND gate 338. The AND gate 338 outputs to the hit counter 340. The hit counter 340 outputs to the memory 342. The memory 342 outputs to, and receives input from, both the window control circuit 344 and the window results comparison circuit 346. The memory 342 also outputs to the $V_{REF}$ generator 348. The system clock 312 provides a system clock signal for the retimer 300, and outputs the clock signal to the window control circuit 344. The window control circuit 344 outputs a reference voltage control signal to the $V_{REF}$ generator 348, and outputs a STORE control signal to the hit counter 340. The window control circuit 344 also outputs an ENABLE signal to the first and second error comparators 332 and 334 in response to the sampling timing signal from the data sampling circuit 308 and the system clock signal from the system clock 312.

The window control circuit 344 activates the windowing function of the reference voltage adjustment circuit 314, which uses a specified number S of samples to complete the windowing function for a reference voltage $V_{REF\_-2}$ or $V_{REF\_2}$. For example, S can equal forty thousand samples. In some examples, data is coded for even symbol distribution across the four PAM4 voltage levels. Accordingly, forty thousand samples corresponds to approximately ten thousand samples each of level(−3), level(−1), level(1), and level(3) data values.

The reference voltages $V_{REF\_-2}$ and $V_{REF\_2}$ used by the first and third data slicers 322 and 326 are determined using the windowing function. Accordingly, these reference voltages can be, but are not necessarily, shifted from their default voltage levels (level(−2) 214 and level(2) 218) by the windowing function. The window control circuit 344 activates the first and second error comparators 332 and 334 to perform the windowing function at specified intervals. The window control circuit 344 activates the first and second error comparators 332 and 334 by asserting the ENABLE signal. The specified intervals are measured using the system clock signal provided by the system clock 312. In some examples, the windowing function is performed as a relatively slow loop run as a background process, such as at two second intervals. For example, transmitter linearity conditions can fluctuate, receiver gain may be only partially controlled, and channel loss and CTLE output change with temperature, each of which can lead to varying gain compression. The windowing function can be used to track this variable nonlinearity.

Figure 4A:
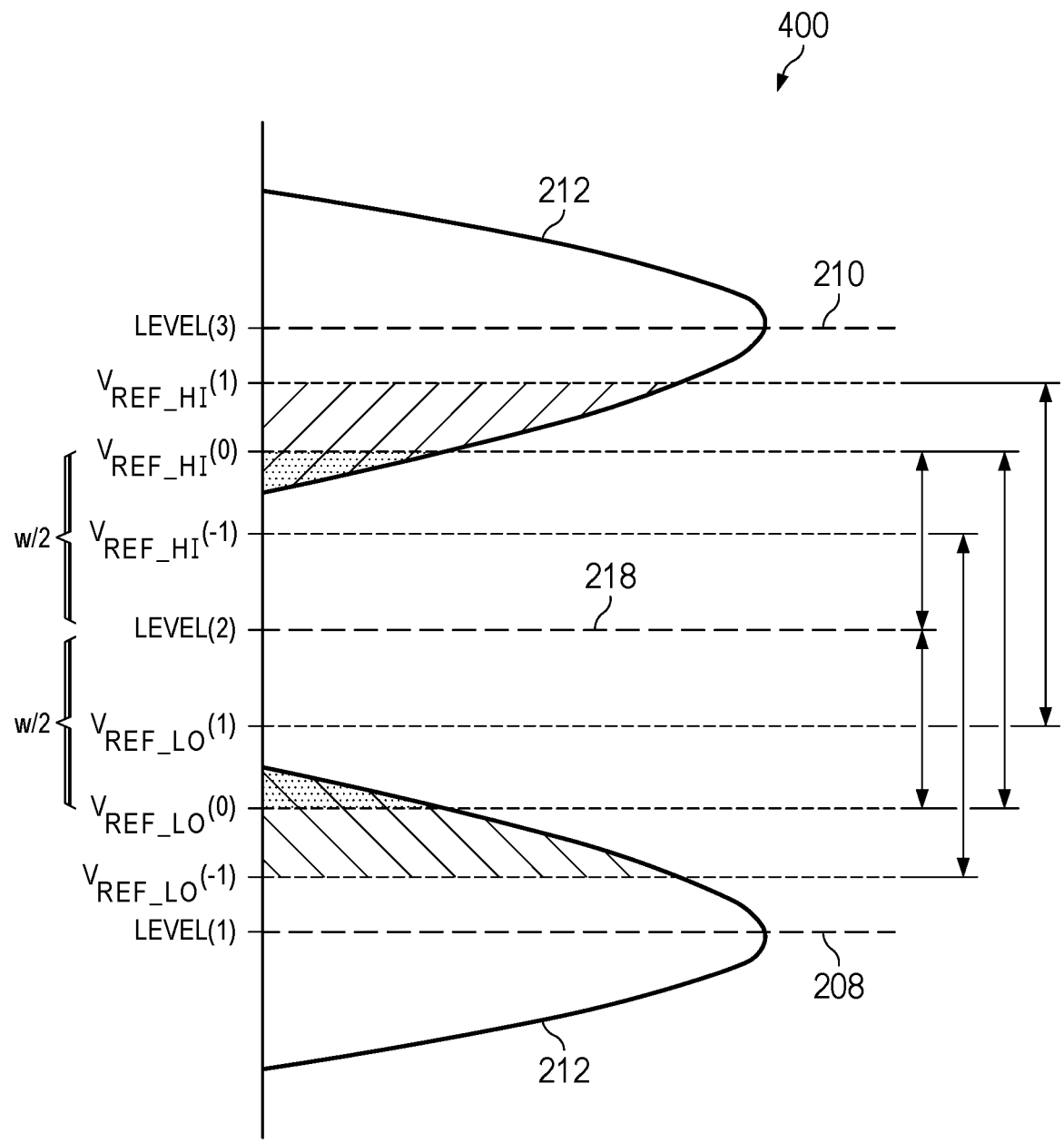
FIG. 4A shows an example probability distribution and windowing function discriminating between two voltage levels, respectively signifying two data levels for the retimer of FIG. 3, in order to iteratively determine a corrected midpoint voltage value between them.

FIG. 4A shows an example probability distribution 400 and windowing function discriminating between two voltage levels 210 and 212, respectively signifying two data levels for the retimer of FIG. 3, in order to iteratively determine a corrected midpoint voltage value between them. The window function may commence testing at a nominal reference voltage, such as $V_{REF\_2}$ (level(2) 218)) as shown. The window control circuit 344 specifies a number N voltage value windows, each defined between a respective low reference voltage $V_{REF\_LO}$ and a high reference voltage $V_{REF\_HI}$ and bracketing a range that is a fixed number W volts across. For example, a first window can be established centered at the reference voltage level(2) 218, with a corresponding $V_{REF\_HI}(0)$ and $V_{REF\_LO}(0)$ being W volts apart. Some of the test pairs have respective voltages higher than the initial test pair $V_{REF\_LO}(0)$ and $V_{REF\_HI}(0)$, and some of the test pairs have respective voltages lower than $V_{REF\_LO}(0)$ and $V_{REF\_HI}(0)$. In some examples, test pairs are selected so that different $V_{REF\_LO}$ voltages are a minimum voltage step of the $V_{REF}$ generator 348 apart, and different $V_{REF\_HI}$ voltages are a minimum voltage step of the $V_{REF}$ generator 348 apart.

An initial $V_{REF\_LO}$, $V_{REF\_LO}(0)$, is W/2 volts below the reference voltage being tested, and an initial $V_{REF\_HI}$, $V_{REF}$ HO), is W/2 volts above the reference voltage being tested. W is selected so that a relatively small fraction of samples, but not zero samples, will have voltages between $V_{REF\_LO}$ and $V_{REF\_HI}$ if the midpoint between $V_{REF\_LO}$ and $V_{REF\_HI}$ equals the midpoint between the nearby elevated probability regions 212. W is determined by, for example, lab experiments and iteration, or by calculation. In the example shown in FIG. 4A, the nearby elevated probability regions 212 are the level(1+a) 222 and level(3) 210 elevated probability regions 212. In some but not all examples, the windowing function adjusts $V_{REF\_2}$ to compensate for gain compression corresponding to the voltage shift a of level(1+a) 222.

A fraction S/N of the samples being used to test the reference voltage are provided to the respective first inputs of the first and second error comparators 322 and 324. Logical ones (e.g., logical "high" values or binary "1") output by the AND gate 338 correspond to samples with voltage between $V_{REF\_LO}(0)$ and $V_{REF\_HI}(0)$; these logical ones are referred to herein as hits, which are counted by the hit counter 340. The window control circuit 344 asserts the STORE control signal to cause the hit counter 340 to store the final count of hits corresponding to $V_{REF\_LO}(0)$ and $V_{REF\_HI}(0)$ in the memory 342. This process is repeated for sequentially higher voltage test pairs, $V_{REF\_LO}(1)$ and $V_{REF\_HI}(1)$, $V_{REF\_LO}(2)$ and $V_{REF\_HI}(2)$ (not shown), and so on; and for sequentially lower voltage test pairs, $V_{REF\_LO}(-1)$ and $V_{REF\_HI}(-1)$, $V_{REF\_LO}(-2)$ and $V_{REF\_HI}(-2)$ (not shown), and so on.

After S samples have been tested, the window control circuit 344 causes the memory 342 to provide the hit counts for each test pair to the window results comparison circuit 346. The window results comparison circuit 346 determines which test pair produced the lowest hit count. This lowest-hit-count test pair is shifted from the level(2) 218 voltage by a voltage corresponding to a number X voltage steps in a positive voltage direction of the $V_{REF}$ generator 348. X can be zero or nonzero. The example illustrated in FIG. 4A shows the window returning the lowest number of hits has reference voltages $V_{REF\_LO}(0)$ and $V_{REF\_HI}(0)$, meaning that X equals zero.

Figure 4B:
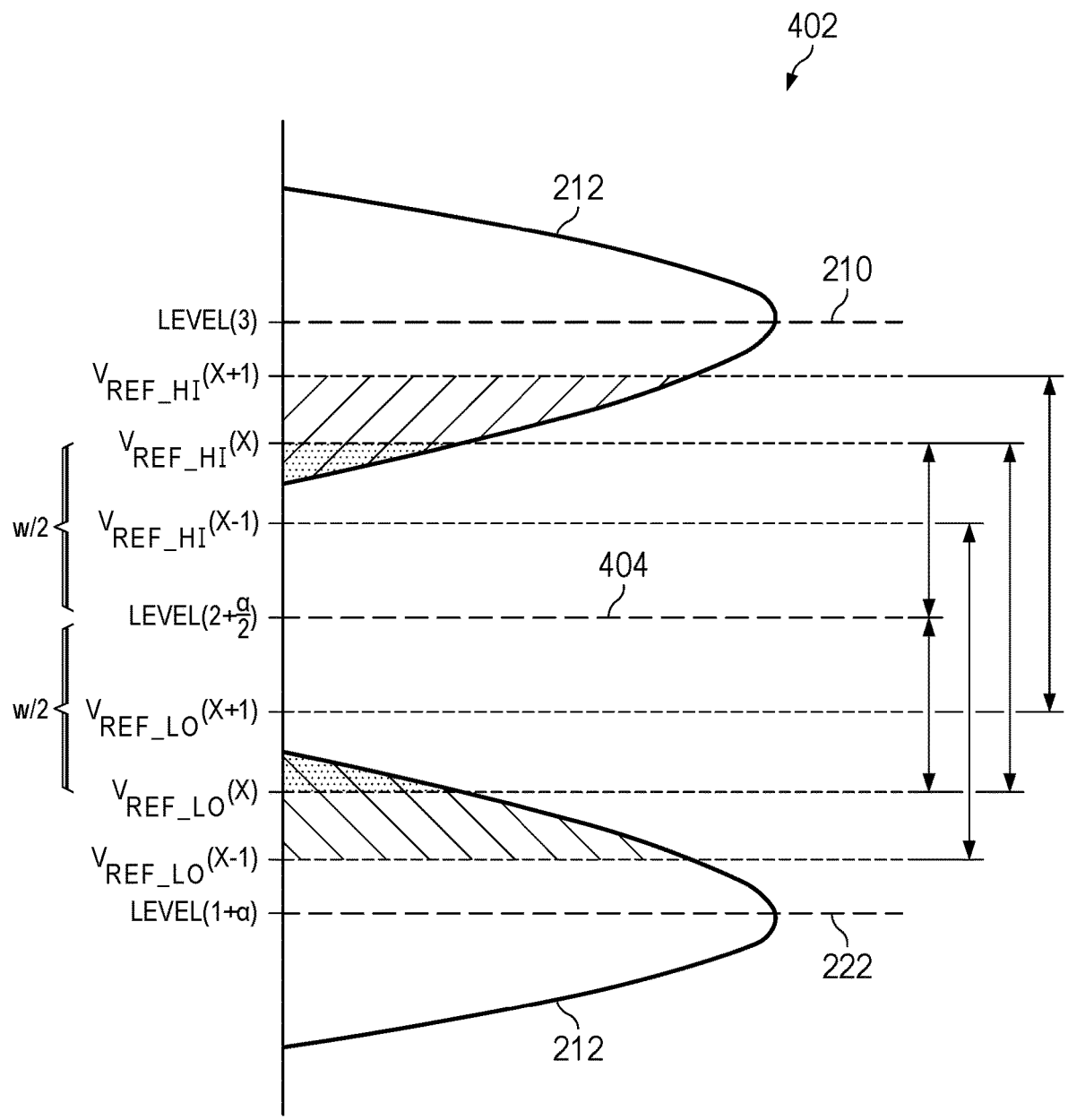
FIG. 4B shows an example probability distribution and windowing function discriminating between two voltage levels, respectively signifying two data levels for the retimer of FIG. 3, in order to iteratively determine a corrected midpoint voltage value between them.

FIG. 4B shows an example probability distribution 402 and windowing function discriminating between two voltage levels 210 and 222, respectively signifying two data levels for the retimer of FIG. 3, in order to iteratively determine a corrected midpoint voltage value between them. In the illustrated example, which is a general case, a midpoint between level(1+a) 222 and level(3) 210 is located at a level(2+a/2) 404, and the window resulting in the fewest hits corresponds to $V_{REF\_LO}(X)$ and $V_{REF\_HI}(X)$.

After determining a lowest-hit-count test pair for a first reference voltage to be tested (level(2) 218 in the example of FIGS. 4A and 4B), the windowing function is repeated, using another S samples and a corresponding set of test pairs, for the other reference voltage(s) potentially affected by gain compression. In the example corresponding to FIGS. 2B and 3, the windowing function is repeated for level(−2) 214 to produce a corresponding test pair with a lowest hit count that is shifted from the level(−2) 214 voltage by a number Y voltage steps in a positive voltage direction of the $V_{REF}$ generator 348. Y can be zero or nonzero.

The numbers X and Y both include two types of deviation from default reference voltage levels: nonlinearity and offset. Nonlinearity, as described above, is a symmetric, typically slowly changing deviation caused by gain compression. Nonlinearity causes higher reference voltages to increase in voltage and lower reference voltages to decrease in voltage by a same amount. For example, nonlinearity corresponds to positive X and negative Y, or negative X and positive Y. Offset is a transient—more rapidly varying—deviation that causes higher and lower reference voltages to both increase or both decrease by a same amount (asymmetrically with respect to ideal voltages). For example, offset corresponds to positive X and positive Y, or negative X and negative Y. In some examples, rapidly-varying offset is not addressed by the relatively slow loop of the windowing function. Accordingly, offset is subtracted from X and Y to determine an adjusted X value to use in generating $V_{REF\_2}$ and an adjusted Y value to use in generating $V_{REF\_-2}$. This can be done using Equations 1 and 2, in which the subtrahend (the subtracted value) equals the offset:

$$\text{adjusted } X = X - \frac{X+Y}{2} \qquad \text{Equation 1}$$

$$\text{adjusted } Y = Y - \frac{X+Y}{2} \qquad \text{Equation 2}$$

$V_{REF\_-2}$ is generated as the default level(−2) 214 voltage plus adjusted Y minimum voltage increments of the $V_{REF}$ generator 348. $V_{REF\_2}$ is generated as the default level(2) 218 voltage plus adjusted X minimum voltage increments of the $V_{REF}$ generator 348. In an example, testing using the windowing function returns X equals+4 for the level(2) 218 reference voltage and Y equals −2 for the level(−2) 214 reference voltage. As described above, nonlinearity due to gain compression affects the level(−2) 214 and level(2) 218 reference voltages symmetrically. The example X and Y deviate from symmetry by an offset of +1 (see Equations 1 and 2)—both X and Y are offset from symmetry by one unit in a positive direction. Accordingly, adjusted X, and $V_{REF\_2}$, equal 3; and adjusted Y, and $V_{REF\_-2}$, equal –3.

FIG. 5 shows an example process 500 for adjusting reference voltages of voltage slicers 322, 324, and 326 in the retimer 300 of FIG. 3. In step 502, in response to the system clock 312, the window control circuit 344 asserts the ENABLE signal to activate the first and second error comparators 332 and 334. In step 504, the window control circuit causes the $V_{REF}$ generator 348 to provide (to the respective second inputs of the first and second error comparators 332 and 334) a test pair of $V_{REF\_LO}$ and $V_{REF\_HI}$ that are a fixed number W volts apart. $V_{REF\_LO}$ and $V_{REF\_HI}$ correspond to (and bracket) one of a pair of symmetric default voltage slicer reference voltages (for example, level(–1) 206 and level(1) 208 are symmetric) that are potentially affected by nonlinearity (for example, gain compression). In some examples, a center voltage of an initial $V_{REF\_LO}$ and $V_{REF\_HI}$ is a default reference voltage of a corresponding voltage slicer.

In step 506, a fraction S/N of the samples being used to test the reference voltage are provided to the respective first inputs of the first and second error comparators 332 and 334. In step 508, the hit counter 340 counts the number of samples with voltages between $V_{REF\_LO}$ and $V_{REF\_HI}$. In step 510, after S/N samples are tested using the $V_{REF\_LO}$ and $V_{REF\_HI}$ pair, the window control circuit 344 sends a STORE signal to cause the hit counter 340 to store the current count in the memory 342. In step 512, the process 500 is repeated from step 504 for a number N test pairs of $V_{REF\_LO}$ and $V_{REF\_HI}$, with center voltages of some test pairs displaced above and center voltages of some test pairs displaced below the default reference voltage, different test pairs displaced from each other by a minimum voltage increment of the $V_{REF}$ generator 348.

In step 514, after S samples have been tested, the window control circuit 344 causes the memory 342 to provide the hit counts for each test pair to the window results comparison circuit 346. In step 516, the window results comparison circuit 346 determines which test pair produced the lowest hit count for the voltage slicer reference voltage being tested in the current iteration, and stores a center voltage of this test pair in the memory 342. In step 518, the process 500 is repeated from step 504 for a symmetric voltage slicer reference voltage (for example, level(–1) 206 and level(1) 208 are symmetric). In step 520, the center voltages of the test pairs that produced the lowest hit counts are adjusted to remove an offset contribution, and the adjusted center voltages are used as corresponding voltage slicer reference voltages.

As described above, center voltages of some probability distributions of voltages of received signals corresponding to signal logical values can be shifted by nonlinear gain caused by, for example, the equalizer circuit 316 and the VGA 320. This shifts voltage midpoints between adjacent probability distributions of voltages corresponding to logical values of the signal. The retimer 300 of FIG. 3 and the method 500 of FIG. 5 are used to iteratively determine corrected values for these voltage midpoints. Using corrected voltage midpoints as voltage slicer reference voltages lowers a BER of the retimer 300.

Modifications are possible in the described embodiments, and other embodiments are possible, within the scope of the claims.

In some examples, a signal modulation scheme other than PAM4 is used.

In some examples, a signal modulation scheme has three or more possible logical values, corresponding to respective ideal voltage levels.

In some examples, a different number S of samples to be tested can be used for sets of test pairs of $V_{REF\_LO}$ and $V_{REF\_HI}$ corresponding to different reference voltages, such as level(–2) 214 and level(2) 218.

In some examples, test pairs of $V_{REF\_LO}$ and $V_{REF\_HI}$ are tested in a different order than described above.

In some examples, factors other than those described above cause nonlinearity compensated for by the described windowing function of the reference voltage adjustment circuit 314.

In some examples, reference voltages are tested in a different order than described above. In some examples, test pairs are tested in a different order than described above.

In some examples, other factors in addition to those described above are included in determining reference voltages for voltage slicers.

In some examples, the number S of samples to be tested is encoded in hardware.

In some examples, a hit sensor other than a counter is used to determine which window results in the smallest number of hits.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero. Modifications are possible in the described examples, and other examples are possible within the scope of the claims.

What is claimed is:

1. A retimer comprising:
an input configured to receive a data stream;
a reference voltage generator including an input and first, second, third, fourth, and fifth outputs;
first, second, third, and fourth comparators that include respective first inputs, respective second inputs, and respective outputs, the first inputs of the first, second, third, and fourth comparators configured to receive samples of the data stream, the second inputs of the first, second, third, and fourth comparators coupled to respective ones of the first, second, third, and fourth outputs of the reference voltage generator;
a hit sensor including a first input, a second input, and an output, the first and second inputs of the hit sensor respectively coupled to the outputs of the third and fourth comparators;
a window results comparison circuit including an input and an output, the input of the window results comparison circuit coupled to the output of the hit sensor; and
a window control circuit including a first input and a first output, the first input of the window control circuit coupled to the output of the window results comparison circuit, the first output of the window control circuit coupled to the input of the reference voltage generator.

2. The retimer of claim 1, further including:
a receiver configured to receive the data stream from a communications channel;
a clock data recovery (CDR) circuit coupled to the receiver;
an equalizer circuit including multiple equalizer stages, and coupled to the receiver; and
a variable gain amplifier (VGA) coupled to the equalizer circuit.

3. The retimer of claim 2, further including:
a sampling timer coupled to the CDR circuit; and
a data sampling circuit coupled to the VGA and to the sampling timer, wherein the first inputs of the first, second, third, and fourth comparators are coupled to the data sampling circuit.

4. The retimer of claim 3, wherein a second input of the window control circuit is coupled to the sampling timer; and wherein a second output of the window control circuit is coupled to a control input of the hit sensor.

5. The retimer of claim 4, further including a system clock coupled to a third input of the window control circuit; wherein a third output of the window control circuit is coupled to a control input of the third comparator and a control input of the fourth comparator.

6. The retimer of claim 1, further including:
a signal generator including a first input, a second input, and an output, the first and second inputs of the signal generator respectively coupled to the outputs of the first and second comparators; and
a transmitter including an input coupled to the output of the signal generator.

7. The retimer of claim 1, wherein the reference voltage generator is configured to respectively provide first and second reference voltages to the first and second outputs of the reference voltage generator; and wherein the window control circuit is configured to cause the reference voltage generator to sequentially provide multiple first reference voltages to the third output of the reference voltage generator and to provide multiple second reference voltages to the fourth output of the reference voltage generator, different ones of the first reference voltages corresponding to different ones of the second reference voltages.

8. The retimer of claim 7, wherein the multiple first reference voltages are higher than the multiple second reference voltages.

9. The retimer of claim 7, wherein the window results comparison circuit is configured to select a window corresponding to one of the first reference voltages and one of the second reference voltages, responsive to the input of the window results comparison circuit, and wherein the window control circuit is configured to cause the reference voltage generator to adjust the first reference voltage or the second reference voltage responsive to the selected window.

10. The retimer of claim 1, wherein the hit sensor is a counter.

11. The retimer of claim 1, further including:
a system clock including an output;
a clock data recovery (CDR) circuit coupled to the receiver; and
a sampling timer coupled to the CDR circuit;
wherein the third and fourth comparators respectively include a control input; and
wherein the window control circuit includes a second input, a third input, and a second output, the second input of the window control circuit coupled to the sampling timer, the third input of the window control circuit coupled to the system clock, and the second output of the window control circuit coupled to the control inputs of the third and fourth error comparators.

12. The retimer of claim 11, wherein the window control circuit is configured to provide an ENABLE signal to the second output of the window control circuit in response to the second and third inputs of the window control circuit.

13. The retimer of claim 1, further comprising a window comparator comprising the third and fourth comparators, wherein the reference voltage generator is configured to provide a first test pair of reference voltages to the window comparator, and wherein the window comparator is configured to compare a first set of samples of the data stream to the first test pair of reference voltages.

14. The retimer of claim 13, wherein the hit sensor is configured to increment a first test count of a counter in response to each sample of the first set of samples being within a first voltage window formed by the first test pair of reference voltages.

15. The retimer of claim 14, wherein the reference voltage generator is configured to provide a second test pair of reference voltages to the window comparator, wherein the hit sensor is configured to increment a second test count of the counter in response to each sample of a second set of samples being within a second voltage window formed by the second test pair of reference voltages.

16. The retimer of claim 15, wherein the first voltage window has a first center voltage that is different from a second center voltage of the second test pair, wherein the first voltage window and the second voltage window has the same voltage window.

17. The retimer of claim 15, further comprising a voltage slicer that includes the first and second comparators, wherein the window result comparison circuit is configured to determine which of the first or second test count is a lower count, and wherein the voltage slicer is configured to determine logical values of the data stream based on a center frequency of a test pair selected from the first and second test and corresponding to the lower count.

18. The retimer of claim 15, further comprising a memory configured to store the first and second test counts.

* * * * *